United States Patent Office 2,850,366
Patented Sept. 2, 1958

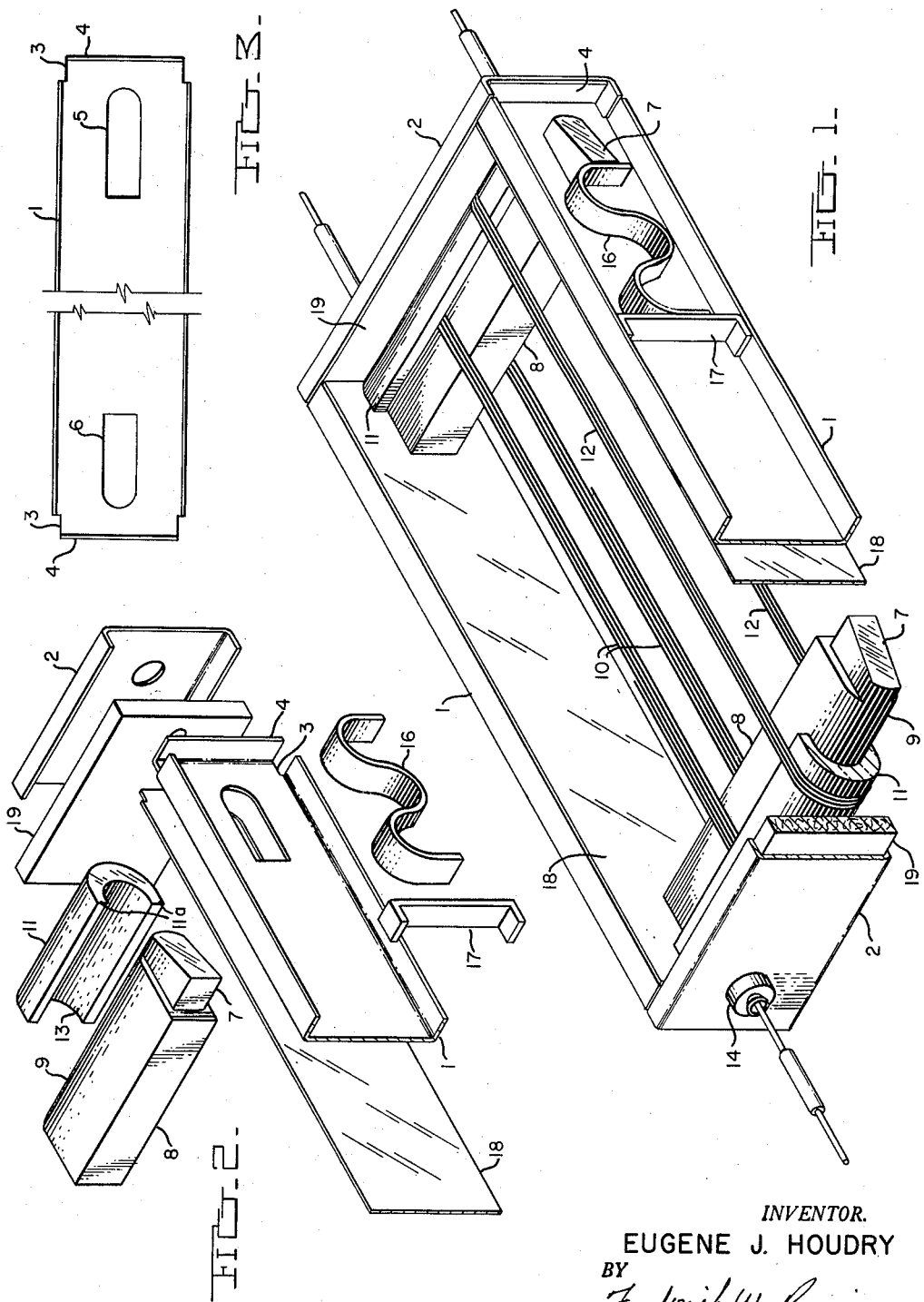

2,850,366

FILAMENT SUPPORTING UNIT

Eugene J. Houdry, Ardmore, Pa., assignor to Oxy-Catalyst, Inc., a corporation of Pennsylvania Application June 7, 1955, Serial No. 513,640

5 Claims. (Cl. 23—288)

This invention relates to filament supports of a type particularly but not exclusively intended for use in connection with filament type catalytic units.

The malodorous and otherwise offensive components of gases, such as the gases which emanate from industrial and domestic ovens, incinerators, roasters and similar devices, can very often be eliminated by catalytic oxidation. Where this method of gas purification is employed, it is in general merely necessary to provide a suitable catalyst in the path of the gases in such manner that the gases will intimately and completely contact the catalyst so that the desired reactions will take place. It is also necessary that the catalyst be at its operating temperature for the reactions since, as a practical matter, most catalysts are operative only at some temperature in excess of ordinary room temperatures. Depending upon the type of catalyst employed and the nature of the gases being purified, this temperature will usually be at least 450° F. and may be somewhat higher under particular circumstances.

For many types of installations it has been found that it is desirable to provide the catalyst in the form of a metallic filament or wire, preferably of a small diameter, which is coated with or which consists of catalytic material. Such catalytic filaments of small diameter provide a relatively large surface-to-volume ratio and a correspondingly large amount of catalytic surface per unit of length which, of course, is desirable since catalysis is a surface phenomenon and is dependent upon the provision of sufficient catalytic surface if the reactions are to proceed to substantial completion. Furthermore, wire type or filament type catalysts of small diameter can be heated to their operating temperature with relative ease since the amount of heat required to raise the temperature of a small diameter wire is relatively low. If heat over and above that released by the oxidation reactions is required to maintain the catalyst operating temperature, this heat can be provided by merely passing an electric current through the filament which, to this end, should be of a material having sufficient electrical resistance to be heated by this expedient. As a practical matter it has been found that such extraneous heating is usually necessary to obtain substantially complete clean-up since the amount of heat released by catalytic oxidation of gases such as oven effluents is negligible, or at least is not sufficient to maintain the temperature of the catalyst at a temperature in excess of 450° F.

It is an object of the present invention to provide a filament type catalytic unit in which the catalytic filament or wire is disposed in at least four closely spaced parallel planes, each consisting of a plurality of closely spaced side-by-side filament strands. This arrangement of the catalyst in the unit of four parallel planes provides for repeated contacting of the gases flowing through the unit as it successively passes over each of the planes of filament strands and thereby contributes to substantial clean-up of the gases. Moreover, the relatively close spacing of the planes of strands and the relatively close spacing of the individual strands of each plane causes turbulence and homogenization of the gas stream as it passes through the catalytic unit which further improves the completeness of contacting.

A further object of the invention is to provide a filament type unit embodying a plurality of multi-stranded filament planes in which the individual strands are maintained in tension by means of a biasing means integral with the unit. By virtue of this aspect of the invention, sagging and/or buckling of the strands with concomitant short circuiting between adjacent strands or the opening of gaps between strands is avoided and the efficiency of the unit is maintained. Further objects of the invention will be apparent from the following description and from the annexed drawings in which:

Fig. 1 is a perspective view of a preferred embodiment of the invention.

Fig. 2 is an exploded fragmentary view of a corner of the unit shown in Fig. 1, showing the manner in which the various components are inter-related.

Fig. 3 is a plan view of a component of the frame of the coil support.

In the disclosed embodiment the coil support of the catalytic unit is contained within a generally open rectangular frame consisting of side members 1 and end members 2 of stainless steel or similar temperature resistant metal. Both the side and end members 1, 2 are channel shaped in cross-section and the side members are provided at each end thereof with an extension 3 of the base portion of the channel which is bent upon itself as indicated at 4 to provide an upstanding end flange. This flange is received within the sides of the end members 2 and is preferably welded or otherwise suitably secured thereto in order to impart rigidity to the frame. As shown in Fig. 3, each of the side members 1 is provided with openings 5, 6 adjacent each end thereof which openings receive the reduced end portions 7 of filament supporting members 8 which may be of suitable insulating material such as porcelain. The opening 5 should be of such size as to permit limited back and forth movement of the filament supporting member supported therein in the plane of the frame while the opening 6 is preferably somewhat smaller so that the filament supporting member supported therein is fixedly supported within the frame.

The filament supporting members as best shown in Figs. 1 and 2, are provided with a rounded edge 9 over which a first catalytic filament 10 is continuously coiled in such manner as to provide a plurality of filament strands in two parallel planes with each strand extending from each of the filament supporting members to the other. The filament 10 should, of course, have catalytic properties in order to bring about catalytic oxidation of the objectionable components in the gas stream in which the device is being used. It has been found that a highly satisfactory catalyst can be provided in the form of a wire coated with a catalytic form of an inorganic oxide which functions as a catalyst carrier, the wire itself preferably consisting of the commercially available nickel-chrome alloy known as Nichrome (80% Ni–20% Cr). This material is an electric conductor and is readily heated by the passage of an electric current therethrough to a temperature at which the catalytic coating is operative to effect clean-up of the gas stream. The coating provided should preferably be of the type disclosed in the copending application of Eugene J. Houdry and W. M. Adey, Serial Number 366,057, filed July 3, 1953, for "Catalytic Structure." As explained in said Houdry et al. application excellent results can be obtained if a coating of finely divided alumina or a mixture of catalytic alumina and beryllia is provided on the surface of the wire and the coating is subsequently impregnated with a catalytic metal such as platinum. The preferred diameter for the filament 10 should, as previously mentioned, be relatively small. It has been found in practice that a diameter of 0.0159" is sufficient in the case of a Nichrome wire to provide the necessary strength for the filament while still providing an optimum surface-to-volume ratio and a maximum of catalytic surface. This wire size, however, can be departed from if desired and is disclosed here only as being the optimum which has been found from previous investigation. As previously mentioned, the wire or filament strands should be spaced relatively closely together in order to maximize contacting of the catalytic surface by the gases. With a wire diameter of about 0.0159" as explained above, it has been found that the spacing between adjacent strands in each plane should preferably be about equal to the wire diameter.

Ceramic spacer members 11 of dielectric material similar to the filament supporting members 8 are provided over each of the filament supporting members for the purpose of permitting provision of a second winding of filament wire 12, as clearly shown in Fig. 1. The spacer members are substantially crescent-shaped in cross section and, as is evident from Fig. 1, provide internal surfaces 13 which conform to the external surface of the filament supporting members so that they can be fitted over the filament supporting members and retained thereon by the tension of the filament winding 12. The second filament preferably consists of a coated wire of the same type and size as the first filament 10 and in its assembled position over the spacer members provides a second set of filament strands disposed in parallel planes which are parallel to and spaced from the parallel planes provided by the filament 10. This arrangement, as is apparent from the drawing, provides four separate planes of filaments, each of which consists of a plurality of side-by-side strands. The spacer members 11 are preferably relatively thin at the edges thereof in order that the individual planes of filament strands will be disposed relatively closely together. To this end the spacer members 11 of the disclosed embodiment are tapered at the edges as indicated at 11a. Thus when gases flow through the central open portions of the frame they must pass over four layers of filament strands successively thereby maximizing the contacting of the gases with the catalytic surface of these filament strands. Also, by virtue of the close spacing of both the filament strands and the planes of strands, the gases are forced to follow a somewhat irregular path and a certain amount of turbulence is established as the gases flow through the unit which further contributes to the completeness of contacting.

The ends of the two filaments 10, 12 are led through the end members 2 by means of insulators 14, of porcelain or similar dielectric material, which are disposed in openings provided in the end members as clearly indicated in the exploded view of Fig. 2. While in the disclosed embodiment, two separate filament windings 10, 12 are provided, it is obvious that under some circumstances it may be preferable to provide only a single winding continuous for all four planes of filament strands. The advantage of the disclosed arrangement is that the two windings can be connected in parallel to a suitable voltage source thereby providing a somewhat higher voltage drop per unit length of wire in the filament and a somewhat higher temperature, or at least a higher maximum attainable temperature.

With filament windings of the type shown it has been found that unless some provision is made to maintain the strands in a taut condition, the thermal elongation which takes place upon heating causes buckling of the strands with resultant short circuiting and/or the opening of rather large gaps which permit passage of gases through the device without undergoing catalytic transformations. As explained in the copending application of Wilfred M. Adey, Serial Number 435,846, filed June 10, 1954, for "Filament Support," this difficulty can be obviated by biasing at least one of the filament supporting members in a direction away from the other. In the disclosed embodiment of the instant invention, this is accomplished by means of a spring 16 of sinuous configuration which reacts against a fixed support 17 welded or otherwise secured to the side members 1. It is understood of course that a spring such as the disclosed spring 16 is provided on each side member to thereby equalize the force acting on the filament supporting member. The spring, as indicated by the drawing, biases the filament supporting member, against which it reacts, in a direction away from the opposite filament supporting member which in turn is held in a relatively fixed position within its accommodating aperture 6. As will be recalled, the apertures 5 in the side members 1 are of a length sufficient to permit some reciprocal movement of the filament supporting member supported therein. Since the spacer member 11 associated with the spring biased filament support member fits over this supporting member, the spring of course maintains all four planes of filaments in a taut condition. The amount of tension required in this spring and the amount of force which must be exerted against the filament supporting member is of course a matter which can best be determined empirically. It might be mentioned, however, that it has been found that with wire of the diameter previously disclosed, sufficient tension can be applied so that the wire strands will be maintained in a taut condition when heated to temperatures 600°–700° F. and higher.

The disclosed embodiment can be assembled by merely clamping the filament supporting members 8 between the side members 1 and winding the inner filament directly over these filament supporting members. Subsequently the spacer members 11 are placed over the filament windings 10 and the filament supporting members and the second filament 12 is wound thereover. The final step of course is to place the end members over the side members and effect the necessary welding to complete the frame. Winding in the manner described above will tend to bias the filament supporting member which is movable in its extreme downward position (i. e. toward its companion filament supporting member). The spring can then be inserted and the tension applied which upon heating of the filament is released so that the strands will be maintained in a taut condition.

As indicated by the reference numeral 18, suitable insulation may be provided on the opposing or inner faces of each of the side members 1 for the purpose of insulating these metallic members from the windings of the filaments 10, 12. This insulation desirably may take the form of mica or other dielectric available in relatively thin sheets and can be retained in position by the shoulder provided by the reduced end portion 7 of the filament supporting members. Additional insulation in the form of sheet Fiberglas 19 may be provided in the space between the end members 2 and the supporting spacers 11 for the purpose of preventing by-pass of gases around the filaments when the unit is in use.

In use of the disclosed embodiment, the frame shown in Fig. 1 is merely disposed in the path of the gas stream, for example, in a flue or in a vent from an oven, in such manner that all of the gases being treated will pass through the central open portions of the frame. The leads from the coils are then connected to a suitable power source so that the coils themselves will be heated to a temperature in the range of about 500°–700° F. Upon subsequent passage of any gases through the coil, the oxidizable components therein will be completely oxidized at the catalytic surfaces of the several layers or planes of filament strands.

It will be apparent to those skilled in the art that while the invention is shown as providing two separate coils or filaments disposed in four separate planes, the number of planes can be increased by merely providing a second spacer member over the spacer member 11 and winding a third filament thereover to thereby provide six separate planes of filament strands. It will also be obvious that while I have disclosed a preferred embodiment of the invention, substantial departures can be made therefrom without violating the spirit or scope of the appended claims. It is obvious, for example, that a helical or coil spring might be substituted for the sinuous bend spring disclosed and that if desired, both of the filament supporting members can be provided in oversized slots so that a single spring could react between the two filament supporting members to thereby maintain the wires in a taut condition.

In the foregoing specification the term "side members" and "end members" with reference to the frame is used only in the interest of convenience and clarity. It is of course obvious that the ends, as shown in Fig. 1, might be substantially elongated and that the sides might be shortened to thereby provide shorter individual strands of catalytic filament while providing a greater number of side-by-side strands. As a practical matter it might be mentioned, the disclosed arrangement of having relatively long strands of a relatively long span is preferable in that the length of the filament supporting members 8 is thereby minimized and the possibility of breakage of these supporting members is also minimized. Other obvious modifications will be apparent to those skilled in the art to which the invention appertains.

I claim as my invention:

1. A multi-filament catalytic unit comprising a pair of filament supporting members arranged in parallel, spaced-apart relationship, and supported between a pair of parallel side members, a catalytic filament wrapped helically around said filament supporting members to provide planes of relatively closely spaced catalytic filaments, spacer members mounted on said filament supporting members and a second length of catalytic filament wrapped helically around said spacer members to provide additional planes of closely spaced catalytic filaments, said spacer members being held in place against and in snug engagement with said filament supporting members by means of said second length of catalytic filament.

2. A multi-filament catalytic unit comprising a pair of filament supporting members arranged in parallel, spaced-apart relationship, and supported between a pair of parallel side members, a catalytic filament wrapped helically around said filament supporting members to provide planes of relatively closely spaced catalytic filaments, spacer members mounted on the outer filament-carrying edges of said filament supporting members, a second length of catalytic filament wrapped helically around said spacer members to provide additional planes of closely spaced filaments, said helical wrapping around said spacer members serving to maintain said spacer members against and in snug engagement with the outer filament carrying edges of said filament supporting members.

3. A multi-filament catalytic unit comprising a pair of filament supporting members arranged in parallel, spaced-apart relationship, the outer, filament carrying edges of said filament supporting members having rounded contours, a first length of catalytic filament wrapped helically around said filament supporting members to provide planes of closely spaced filaments, U-shaped spacer members of electrically insulating material mounted on and embracing the rounded filament carrying edges of said filament-supporting members, a second length of catalytic filament wrapped helically around said spacer members to provide additional planes of closely spaced filaments, the thickness of the legs of said U-shaped spacing members being such as to space said additional planes of filaments relatively short distances from the filament planes wrapped from said first length of filament, said helical wrapping around said spacer members serving to maintain said spacer members against and in snug embracing engagement with the rounded filament carrying edges of said filament supporting members.

4. A multi-filament catalytic unit comprising a pair of filament supporting members arranged in parallel, spaced-apart relationship, and supported between a pair of parallel side members, a catalytic filament wrapped helically around said filament supporting members to provide planes of relatively closely spaced catalytic filaments, spacer members mounted on said filament supporting members and a second length of catalytic filament wrapped helically around said spaced members to provide additional planes of closely spaced catalytic filaments, said spacer members being held in place against and in snug engagement with said filament supporting members by means of said second length of catalytic filament, and means for resiliently biasing at least one of said filament supporting members away from the other whereby said multiple planes of filaments are always maintained in a taut condition as they expand and contract when subjected to heating and cooling.

5. A multi-filament catalytic unit comprising a pair of filament supporting members arranged in parallel, spaced-apart relationship, and supported between a pair of parallel side members, a catalytic filament wrapped helically around said filament supporting members to provide planes of relatively closely spaced catalytic filaments, spacer members mounted on the outer filament-carrying edges of said filament supporting members, a second length of catalytic filament wrapped helically around said spacer members to provide additional planes of closely spaced filaments, said helical wrapping around said spacer members serving to maintain said spacer members against and in snug engagement with the outer filament carrying edges of said filament supporting members, and means for resiliently biasing at least one of said filament supporting members away from the other whereby said multiple planes of filaments are always maintained in a taut condition as they expand and contract when subjected to heating and cooling.

References Cited in the file of this patent

UNITED STATES PATENTS

| | | |
|---|---|---|
| 1,193,799 | Landis | Aug. 8, 1916 |
| 1,390,407 | Wallman | Sept. 13, 1921 |
| 2,156,422 | Baader | May 2, 1939 |
| 2,658,742 | Suter | Nov. 10, 1953 |
| 2,665,356 | Du Bois | Jan. 5, 1954 |